(12) United States Patent
Ikemi et al.

(10) Patent No.: US 12,463,483 B2
(45) Date of Patent: Nov. 4, 2025

(54) COIL FOR MOTOR, METHOD FOR MANUFACTURING COIL FOR MOTOR, AND MOTOR

(71) Applicant: MITSUBISHI HEAVY INDUSTRIES, LTD., Tokyo (JP)

(72) Inventors: Takeshi Ikemi, Tokyo (JP); Shinichi Isobe, Tokyo (JP); Norihito Yanagita, Tokyo (JP); Akiko Kasami, Tokyo (JP); Takashi Arai, Tokyo (JP); Satoshi Nakatsuka, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 296 days.

(21) Appl. No.: 18/284,698

(22) PCT Filed: Feb. 15, 2022

(86) PCT No.: PCT/JP2022/005859
§ 371 (c)(1),
(2) Date: Nov. 17, 2023

(87) PCT Pub. No.: WO2022/209370
PCT Pub. Date: Oct. 6, 2022

(65) Prior Publication Data
US 2024/0186856 A1     Jun. 6, 2024

(30) Foreign Application Priority Data
Apr. 2, 2021 (JP) ................................ 2021-063463

(51) Int. Cl.
*H02K 15/02* (2025.01)
*H02K 3/24* (2006.01)
(Continued)

(52) U.S. Cl.
CPC ............ *H02K 3/24* (2013.01); *H02K 15/026* (2013.01)

(58) Field of Classification Search
CPC .. H02K 3/00; H02K 3/04; H02K 3/12; H02K 3/18; H02K 3/24; H02K 3/34; H02K 9/00;
(Continued)

(56) References Cited

U.S. PATENT DOCUMENTS

2020/0021156 A1 * 1/2020 Taira ..................... H02K 3/325

FOREIGN PATENT DOCUMENTS

| CN | 204820086 U | | 12/2015 | |
| GB | 2403606 A | * | 1/2005 | ............. H02K 9/227 |

(Continued)

OTHER PUBLICATIONS

International Search Report in corresponding International Application No. PCT/JP2022/005859, dated Apr. 12, 2022 (4 pages).
(Continued)

*Primary Examiner* — Tran N Nguyen
(74) *Attorney, Agent, or Firm* — Osha Bergman Watanabe & Burton LLP

(57) ABSTRACT

A coil for a motor includes a coil which is formed of a conductor wound around an axis; and a plurality of cooling portions which are provided to correspond to different winding layers in the conductor. Each of the cooling portions includes a primary portion protruding from the winding layer radially outward and a secondary portion extending from a tip of the primary portion toward a first side in a direction of the axis. The primary portions are formed so that the protrusion length of one of the primary portions, which is located closer to a second side in the direction of the axis than another of the primary portions, is longer than that of the another of the primary portions.

9 Claims, 6 Drawing Sheets

(51) Int. Cl.
*H02K 9/22* (2006.01)
*H02K 15/026* (2025.01)

(58) Field of Classification Search
CPC .......... H02K 9/02; H02K 9/22; H02K 9/227;
H02K 15/00; H02K 15/02; H02K 15/026;
H02K 15/04; H02K 15/06
See application file for complete search history.

(56) References Cited

FOREIGN PATENT DOCUMENTS

| | | | | |
|---|---|---|---|---|
| JP | 2004208461 A | * | 7/2004 | ............ H02K 9/227 |
| JP | 2016-039662 A | | 3/2016 | |
| JP | 2016-163377 A | | 9/2016 | |
| WO | 2012-059790 A1 | | 5/2012 | |
| WO | 2020-137040 A1 | | 7/2020 | |

OTHER PUBLICATIONS

Written Opinion in corresponding International Application No. PCT/JP2022/005859, dated Apr. 12, 2022 (6 pages).

* cited by examiner

COIL FOR MOTOR, METHOD FOR MANUFACTURING COIL FOR MOTOR, AND MOTOR

TECHNICAL FIELD

The present disclosure relates to a coil for a motor, a method for manufacturing a coil for a motor, and a motor.

Priority is claimed on Japanese Patent Application No. 2021-63463, filed Apr. 2, 2021, the content of which is incorporated herein by reference.

BACKGROUND ART

Wires that form the coils for motors are generally covered with an insulating film of resin or the like. When the coils are energized, the coils generate heat and hence the insulating film may deteriorate. Here, as shown in Patent Document 1 below, a configuration has been proposed in which a portion of a winding of a coil is extended to form a projecting portion to function as a cooling fin.

CITATION LIST

Patent Document

Patent Document 1: Japanese Unexamined Patent Application, First Publication No. 2016-163377

SUMMARY OF INVENTION

Technical Problem

However, it is very difficult to stably wind a wire to form the cooling fin. Further, since the cooling fin projects greatly, there is also a problem that the body size of the motor become large.

The present disclosure has been made to solve the above-described problems and an object thereof is to provide a coil for a motor, a method for manufacturing a coil for a motor, and a motor that can be easily manufactured and decreased in size.

Solution to Problem

In order to solve the above-described problems, a coil for a motor according to the present disclosure includes: a coil which is formed of a conductor wound around an axis; and a plurality of cooling portions which are provided to correspond to different winding layers in the conductor, wherein each of the cooling portions includes a primary portion protruding from the winding layer radially outward and a secondary portion extending from a tip of the primary portion toward a first side in a direction of the axis, wherein the primary portions are formed so that the protrusion length of one of the primary portions, which is located closer to a second side in the direction of the axis than another of the primary portions, is longer than that of the another of the primary portions, wherein the secondary portions are formed so that one of the secondary portions, which is joined to one of the primary portions located closer to the second side in the direction of the axis than another of the primary portions, is positioned further outside in the radial direction with respect to another of the secondary portions joined to the another of the primary portions, and wherein at least two of the plurality of secondary portions are arranged to overlap each other at intervals in a radial direction.

Advantageous Effects of Invention

According to the present disclosure, it is possible to provide a coil for a motor, a method for manufacturing a coil for a motor, and a motor that can be easily manufactured and decreased in size.

DESCRIPTION OF EMBODIMENTS (Configuration of Motor)

Figure 1:
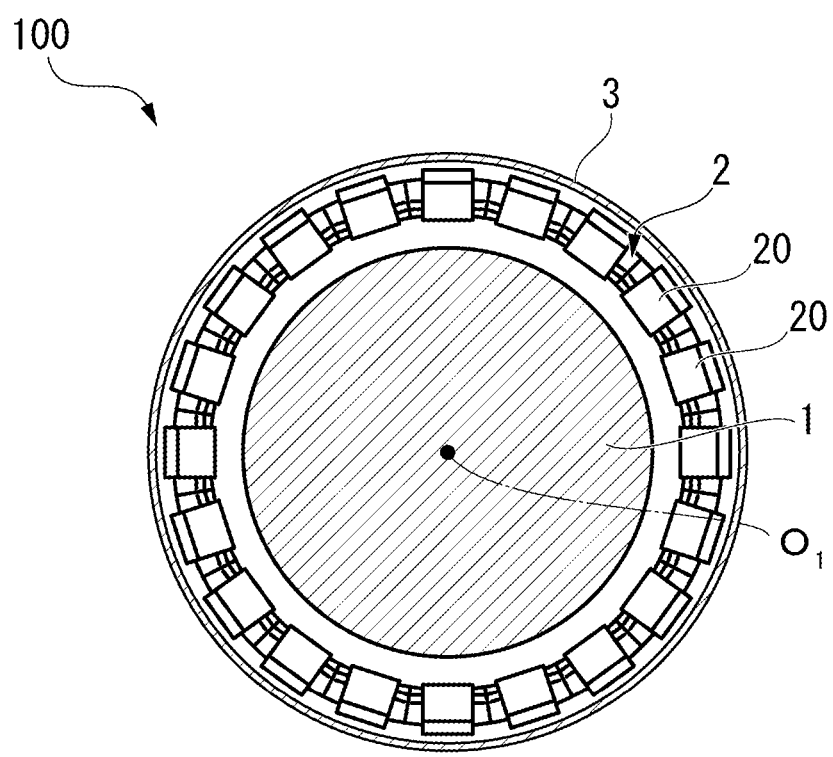
FIG. 1 is a cross-sectional view showing a configuration of a motor according to an embodiment of the present disclosure.

Hereinafter, a motor 100 according to an embodiment of the present disclosure will be described with reference to FIGS. 1 to 4. As shown in FIG. 1, the motor 100 includes a rotor 1, a stator 2, and a housing 3. The rotor 1 is formed in a columnar shape extending along a main axis O1. Although not shown in detail, a plurality of permanent magnets are arranged in the circumferential direction inside the rotor 1. Alternatively, it is also possible to adopt a configuration in which cylindrical magnets are attached to the outer peripheral surface of the rotor 1. The rotor 1 is supported to be rotatable around the main axis O1.

The stator 2 covers the rotor 1 from the outer peripheral side. The stator 2 is formed in an annular shape centered on the main axis O1. The stator 2 is formed by connecting a plurality of stator cores 26 (to be described later) in the circumferential direction. The configurations of the stator core 26 and a coil 20 for a motor will be described later. The housing 3 covers the stator 2 from the outer peripheral side. The stator 2 is fixed to the inner peripheral surface of the housing 3 by shrink fitting or the like.

(Configuration of Coil for Motor)

Figure 2:
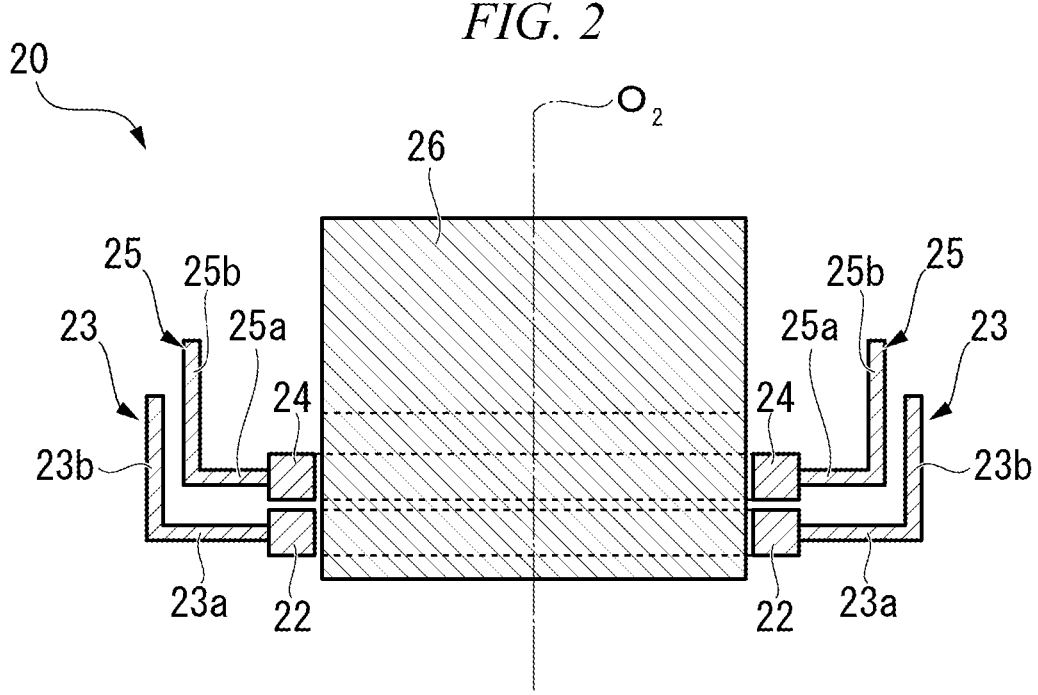
FIG. 2 is a cross-sectional view showing a configuration of a coil for a motor according to the embodiment of the present disclosure.

Next, the configuration of the coil 20 for the motor will be described with reference to FIGS. 2 to 4. As shown in FIG. 2, the coil 20 for the motor includes two coils (an inner peripheral coil 22 and an outer peripheral coil 24) wound around a coil axis O2, a cooling portion 23 and a cooling portion 25 respectively provided in these coils, and the stator core 26.

The coil axis O2 extends in the radial direction of the main axis O1. The inner peripheral coil 22 is located on the radially inner side in the direction of the coil axis O2 and the outer peripheral coil 24 is located on the radially outer side in the direction of the coil axis O2. As shown in FIG. 4, the inner peripheral coil 22 and the outer peripheral coil 24 are wound in a rectangular or circular ring shape when viewed from the direction of the coil axis O2. Further, although not shown in detail, the inner peripheral coil 22 and the outer peripheral coil 24 are electrically connected to each other. The size of the inner peripheral coil 22 is the same as that of the outer peripheral coil 24. Further, the inner peripheral coil 22 and the outer peripheral coil 24 are formed of conductors.

As shown in FIG. 2, a pair of the cooling portions 23 are integrally provided in the inner peripheral coil 22. One cooling portion 23 is provided on one side in the direction of the main axis O1 of the inner peripheral coil 22 and the other cooling portion 23 is provided on the other side in the direction of the main axis O1 of the inner peripheral coil 22.

The cooling portion 23 includes a primary portion 23a protruding from the inner peripheral coil 22 toward the radially outer side of the coil axis O2 and a secondary portion 23b extending from the tip of the primary portion 23a toward a first side in the direction of the coil axis O2. Accordingly, the cooling portion 23 has an L-shaped cross-sectional shape. Further, as shown in FIG. 3, the secondary portion 23b has a rectangular shape when viewed from the direction of the main axis O1. Further, as shown in FIG. 4, at least one of the primary portion 23a and the secondary portion 23b is provided with one or more ventilation holes h (three ventilation holes h are formed in the primary portion 23a as an example in FIG. 4). These ventilation holes h are arranged at intervals in the direction of the main axis O1.

Again, as shown in FIG. 2, a pair of the cooling portions 25 are integrally provided in the outer peripheral coil 24. One cooling portion 25 is provided on one side in the direction of the main axis O1 of the outer peripheral coil 24 and the other cooling portion 25 is provided on the other side in the direction of the main axis O1 of the outer peripheral coil 24. That is, the cooling portion 23 of the inner peripheral coil 22 and the cooling portion 25 are provided at the same position in the circumferential direction with respect to the coil axis O2 as an example. Additionally, at least a part of the cooling portion 23 and the cooling portion 25 may overlap each other in the circumferential direction with respect to the axis O2.

The cooling portion 25 includes a primary portion 25a protruding from the outer peripheral coil 24 toward the radially outer side of the coil axis O2 and a secondary portion 25b which extends from the tip of the primary portion 25a toward a first side in the direction of the coil axis O2. Accordingly, the cooling portion 25 has an L-shaped cross-section. Further, as shown in FIG. 3, the secondary portion 25b has a rectangular shape when viewed from the direction of the main axis O1. Further, although not shown in the drawings, a plurality of (as an example, three) ventilation holes h are formed in the primary portion 25a similarly to the primary portion 23a. Additionally, the same ventilation hole h may be formed in the secondary portion 25b. Further, the number of the ventilation holes h may be one or more. These ventilation holes h are arranged at intervals in the circumferential direction with respect to the main axis O1. Further, the ventilation hole h of the primary portion 23a and the ventilation hole h of the primary portion 25a overlap each other when viewed from the direction of the coil axis O2.

In the cooling portions 23 and 25 with such a configuration, as shown in FIG. 2, the protrusion length of the primary portion 23a of the cooling portion 23 located on the other side in the direction of the coil axis O2 (that is, the radially inner side with respect to the main axis O1) is longer than that of the primary portion 25a of the cooling portion 25 located on one side in the direction of the coil axis O2. In other words, the radial length with respect to the coil axis O2 of the primary portion 23a is longer than that of the primary portion 25a. Further, the secondary portion 23b corresponding to the primary portion 23a located on the other side of the coil axis O2 is located on the radially outer side.

Figure 3:
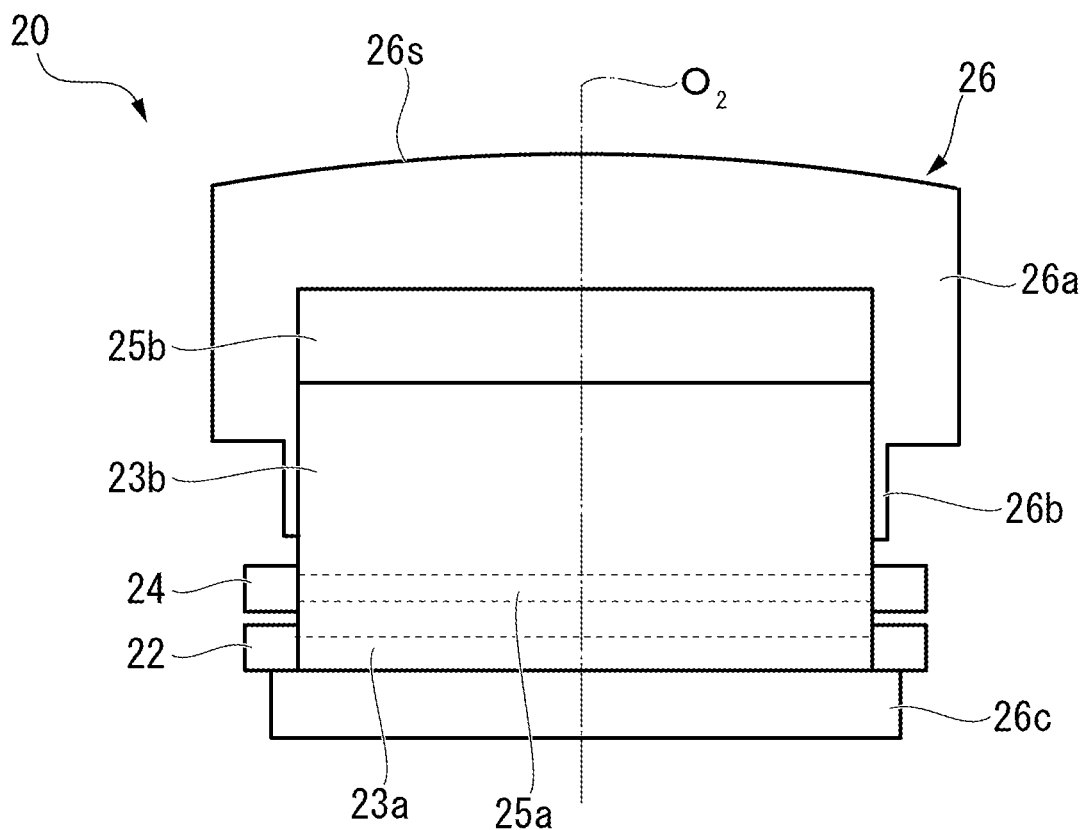
FIG. 3 is a front view showing a configuration of the coil for the motor according to the embodiment of the present disclosure.
Figure 4:
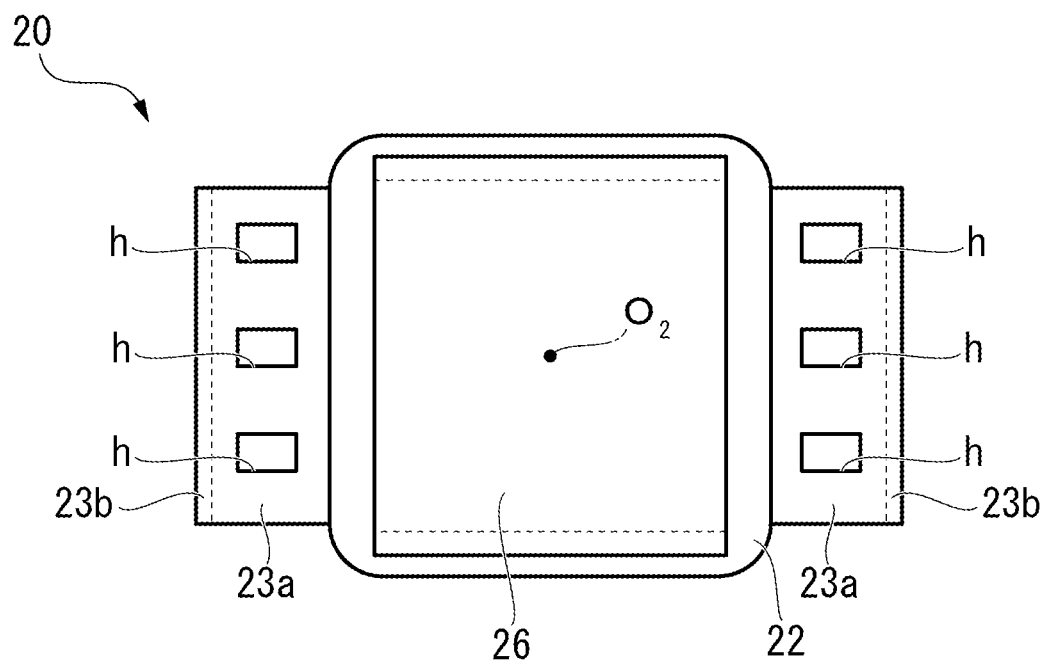
FIG. 4 is a view when the coil for the motor according to the embodiment of the present disclosure is viewed from an inner peripheral side.

Further, as shown in FIGS. 2 and 3, at least a part of the secondary portion 23b of the cooling portion 23 and the secondary portion 25b of the cooling portion 25 overlap each other in the radial direction with respect to the coil axis O2. Further, the secondary portion 25b of the cooling portion 25 protrudes toward one side in the direction of the coil axis O2 more than the secondary portion 23b of the cooling portion 23. Accordingly, at least a part of the secondary portion 25b of the cooling portion 25 is exposed when viewed from the radial direction of the coil axis O2.

Further, a thin-film insulating layer formed of an enamel resin or the like is provided on the surfaces of the inner peripheral coil 22, the outer peripheral coil 24, the cooling portion 23, and the cooling portion 25.

(Configuration of Stator Core)

Next, the configuration of the stator core 26 will be described with reference to FIG. 3. The stator core 26 is inserted to the inner peripheral side of the inner peripheral coil 22 and the outer peripheral coil 24 formed in a rectangular or circular ring shape. The stator core 26 includes a yoke portion 26a, teeth 26b, and a tip portion 26c. A surface (circumferential surface 26s) on one side in the direction of the coil axis O2 of the yoke portion 26a has an arcuate cross-sectional shape. Accordingly, when the plurality of stator cores 26 are connected, the circumferential surfaces 26s are continuous to form a cylindrical surface.

The teeth 26b protrude from the yoke portion 26a toward the other side in the direction of the coil axis O2. The teeth 26b have a cross-sectional area smaller than that of the yoke portion 26a when viewed from the direction of the coil axis O2. The inner peripheral coil 22 and the outer peripheral coil 24 are wound on the teeth 26b. The tip portion 26c is provided on the other side in the direction of the coil axis O2 of the teeth 26b. The tip portion 26c projects in the radial direction with respect to the coil axis O2. Accordingly, the inner peripheral coil 22 and the outer peripheral coil 24 are held not to fall off from the teeth 26b.

(Method for Manufacturing Motor)

Figure 5:
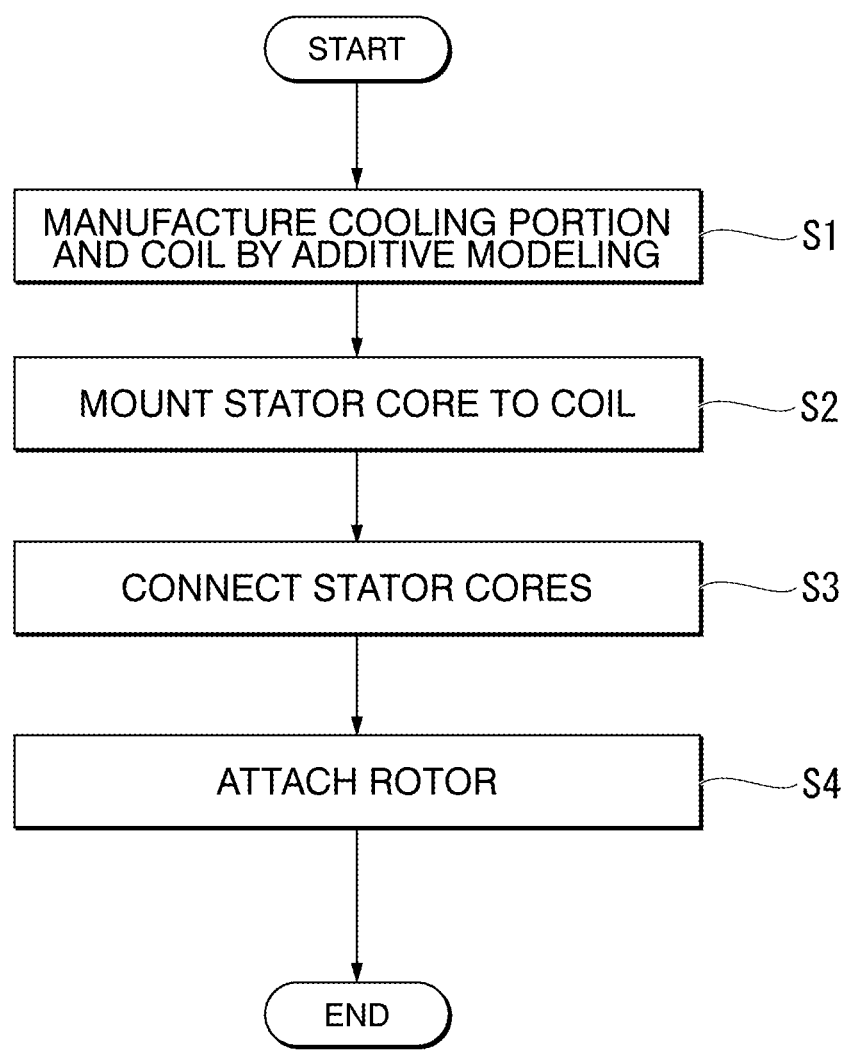
FIG. 5 is a flowchart showing each step of a method for manufacturing a motor according to the embodiment of the present disclosure.

Next, a method for manufacturing the motor 100 (and a method for manufacturing the coil 20 for the motor) will be described with reference to FIG. 5. As shown in the same drawing, the method for manufacturing the motor 100 includes step S1 of manufacturing the inner peripheral coil 22, the outer peripheral coil 24, the cooling portion 23, and the cooling portion 25 by additive modeling, step S2 of mounting the stator core 26 on the inner peripheral coil 22 and the outer peripheral coil 24, step S3 of connecting the plurality of stator cores 26, and step S4 of attaching the rotor 1.

In step S1, fine powder metal is layered and hardened using an additive modeling method (AM modeling method) to obtain predetermined shapes of the inner peripheral coil 22, the outer peripheral coil 24, the cooling portion 23, and the cooling portion 25. Then, the above-described insulating layer is formed on the surfaces of the inner peripheral coil 22, the outer peripheral coil 24, the cooling portion 23, and the cooling portion 25. In step S2, the teeth 26b and the tip portion 26c of the stator core 26 are removed from the yoke portion 26a and then the inner peripheral coil 22 and the outer peripheral coil 24 are mounted on the teeth 26b. Accordingly, the coil 20 for the motor is completed. In step S3, the plurality of stator cores 26 of the coils 20 for motors are connected in the circumferential direction of the main axis O1 to form the annular stator 2. Finally, in step S4, the rotor 1 is inserted through the stator 2. With the above steps, all steps related to the method for manufacturing the motor 100 are completed.

(Operation and Effect)

Next, an example of the operation of the motor 100 will be described. When operating the motor 100, a current is first supplied from the outside to the inner peripheral coil 22 and the outer peripheral coil 24. Accordingly, a magnetic field is formed around the inner peripheral coil 22 and the outer peripheral coil 24. An electromagnetic force is generated by the interaction between this magnetic field and the magnetic field of the permanent magnet embedded in the rotor 1. Based on this electromagnetic force, the rotor 1 rotates around the main axis O1.

Here, the inner peripheral coil 22 and the outer peripheral coil 24 generate heat in accordance with the operation of the motor 100. As heat generation progresses, the insulating layer may be destroyed and the stable operation of the motor 100 may be affected. Here, in this embodiment, the cooling portion 23 and the cooling portion 25 are provided as described above.

According to the above-described configuration, the heat of the inner peripheral coil 22 and the outer peripheral coil 24 is released by the cooling portion 23 and the cooling portion 25 and hence an increase in temperature can be avoided. Further, the cooling portions 23 and 25 are formed in an L shape by the primary portion s 23a and 25a and the secondary portion s 23b and 25b. Further, the plurality of secondary portion s 23b and 25b are arranged to overlap each other in the radial direction. Accordingly, the area occupied by the cooling portions 23 and 25 when viewed from the direction of the coil axis O2 is reduced and hence the coil 20 for the motor can be decreased in size.

Furthermore, according to the above-described configuration, at least a part of the plurality of secondary portion s 23b and 25b do not overlap each other. Accordingly, for example, when blowing air from the outside to the cooling portions 23 and 25 using a fan or the like, the air can be brought into contact with all the secondary portion s 23b and 25b. Accordingly, it is possible to more efficiently perform cooling.

Further, according to the above-described configuration, since the insulating layer is provided, the cooling portions 23 and 25 are electrically insulated from each other. Accordingly, a gap between the cooling portions 23 and 25 can be made as small as possible. As a result, the coil 20 for the motor can be further decreased in size.

Additionally, according to the above-described configuration, the primary portion s 23a and 25a are provided with the ventilation holes h. Accordingly, for example, when blowing air from the outside using a fan or the like, the air can be distributed to each of the cooling portions 23 and 25 via the ventilation holes h. Accordingly, it is possible to more efficiently perform cooling. As an example of mounting the above-described fan, an example can be considered in which a plurality of blades are provided on the end surface of the rotor 1 in the direction of the main axis O1 to configure the fan.

Further, according to the above-described manufacturing method, since the inner peripheral coil 22, the outer peripheral coil 24, and the cooling portions 23 and 25 are integrally formed with each other by additive modeling, it is possible to more easily manufacture the coil 20 for the motor in a short time.

As described above, the embodiment of the present disclosure has been described. Additionally, various changes and modifications can be made to the above-described configuration without departing from the gist of the present disclosure. For example, in the above-described embodiment, an example of forming a two-layer coil consisting of the inner peripheral coil 22 and the outer peripheral coil 24 has been described. However, the number of the coils is not limited to two and may be three or more.

Figure 6:
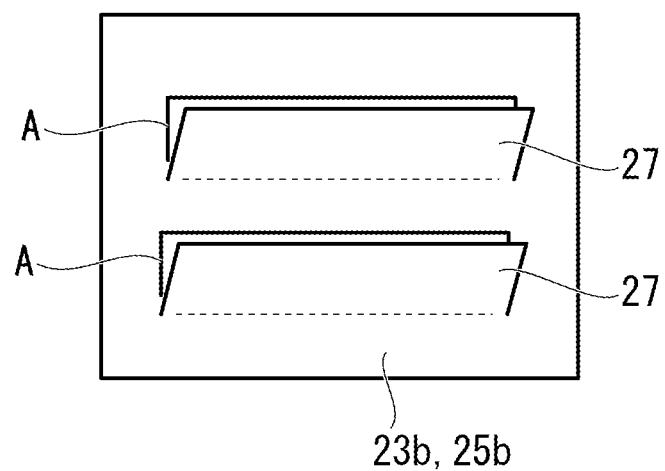
FIG. 6 is a diagram showing a modified example of a cooling portion according to the embodiment of the present disclosure.

Further, as a modified example of the cooling portions 23 and 25 described in the above-described embodiment, it is possible to adopt a configuration shown in FIG. 6. In the example of the same drawing, the secondary portion s 23b and 25b are provided with the opening portion A and the fin portion 27. The opening portion A penetrates the secondary portion s 23b and 25b. The fin portion 27 projects from the edge of the opening portion A to cover at least a part of the opening portion A. According to this configuration, the heat exhaust efficiency of the secondary portion s 23b and 25b is improved by the opening portion A and the fin portion 27 formed in the secondary portion s 23b and 25b. Accordingly, the heat of the coil can be released more quickly.

Figure 7:
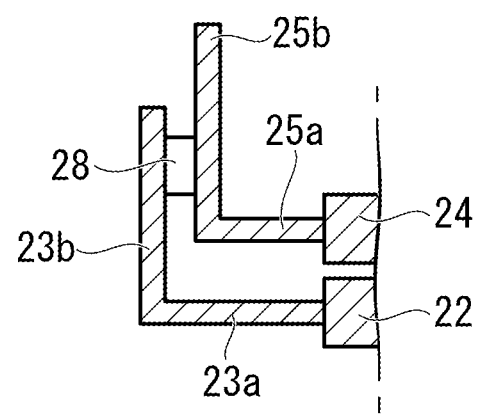
FIG. 7 is a main enlarged view showing a modified example of the coil for the motor according to the embodiment of the present disclosure.

Further, as another modified example, as shown in FIG. 7, the rib 28 can be provided to connect the secondary portion s 23b and 25b in the radial direction of the coil axis O2. According to this configuration, since the secondary portion s 23b and 25b are connected to each other by the rib 28, it is possible to reduce the possibility that the secondary portion s 23b and 25b contact each other, for example, when a vibration is generated. Accordingly, it is possible to suppress noise.

Figure 8:
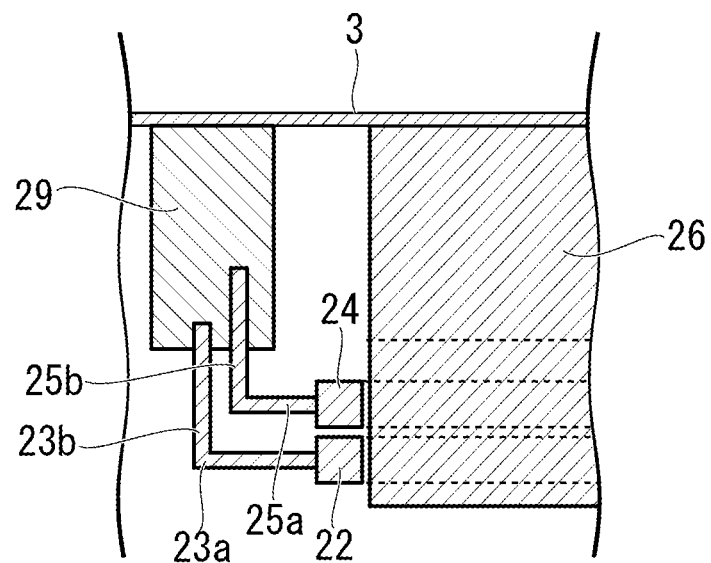
FIG. 8 is a main enlarged view showing another modified example of the coil for the motor according to the embodiment of the present disclosure.

In addition, as another modified example, as shown in FIG. 8, it is also possible to adopt a configuration in which a connection portion 29 covering end portions on one side in the direction of the coil axis O2 of two secondary portion s 23b and 25b and connected to the housing 3 is further provided. The connection portion 29 is integrally formed of resin or metal with high thermal conductivity. According to this configuration, the heat of the secondary portions 23b and 25b can be released to the housing 3 via the connection portion 29. As a result, it is possible to more efficiently cool the motor 100.

<Appendix>

The coil 20 for the motor, the method for manufacturing the coil 20 for the motor, and the motor 100 described in each embodiment are understood, for example, as below.

(1) The coil 20 for the motor according to a first aspect includes: a coil (the inner peripheral coil 22 and the outer peripheral coil 24) which is formed of a conductor wound around an axis (coil axis O2); and a plurality of cooling portions 23 and 25 which are provided to correspond to different winding layers in the conductor, wherein each of the cooling portions 23 and 25 includes a primary portion 23a and 25a protruding from the winding layer radially outward and a secondary portion 23b and 25b extending from a tip of the primary portion 23a and 25a toward a first side in a direction of the axis, wherein the primary portions 23a and 25a are formed so that the protrusion length of one of the primary portions 23a and 25a, which is located closer to a second side in the direction of the axis than another of the primary portions 23a and 25a, is longer than that of the another of the primary portions 23a and 25a, wherein the secondary portions 23b and 25b are formed so that one of the secondary portions 23b and 25b, which is joined to one of the primary portions 23a and 25a located closer to the second side in the direction of the axis than another of the primary portions, is positioned further outside in the radial direction with respect to another of the secondary portions joined to the another of the primary portions, and wherein at least two of the plurality of secondary portions are arranged to overlap each other at intervals in a radial direction.

According to the above-described configuration, the heat of the coil is released by the cooling portions 23 and 25 and hence an increase in temperature can be avoided. Further, the cooling portions 23 and 25 are formed by the primary portions 23a and 25a and the secondary portions 23b and 25b. Further, the plurality of secondary portions 23b and 25b are arranged to overlap each other in the radial direction. Accordingly, the area occupied by the cooling portions 23 and 25 is reduced and hence the coil 20 for the motor can be decreased in size.

(2) In the coil 20 for the motor according to a second aspect, the secondary portion 23b and 25b joined to the primary portion 23a and 25a located on the first side in the direction of the axis protrudes more toward the first side in the direction of the axis.

According to the above-described configuration, at least a part of the plurality of secondary portions 23b and 25b do not overlap each other. Accordingly, for example, when blowing air from the outside to the cooling portions 23 and 25 using a fan or the like, the air can be brought into contact with all the secondary portions 23b and 25b. Accordingly, it is possible to more efficiently cool the coil.

(3) The coil 20 for the motor according to a third aspect may further include an insulating layer which is formed on surfaces of the coil and the cooling portion 23 and 25.

According to the above-described configuration, since the insulating layer is provided, the cooling portions 23 and 25 are electrically insulated from each other. Accordingly, a gap between the cooling portions 23 and 25 can be made as small as possible. As a result, the coil 20 for the motor can be further decreased in size.

(4) In the coil 20 for the motor according to a fourth aspect, the coil 20 is provided with at least one of a ventilation hole h penetrating the primary portion 23a and 25a in a radial direction and another ventilation hole h penetrating the secondary portion 23b and 25b in a circumferential direction.

According to the above-described configuration, since the ventilation hole is formed in at least one of the primary portion s 23a and 25a and the secondary portion s 23b and 25b, air can be distributed to each of the cooling portions 23 and 25 via the ventilation holes h, for example, when blowing the air from the outside using a fan or the like. Accordingly, it is possible to more efficiently cool the coil.

(5) In the coil 20 for the motor according to a fifth aspect, the secondary portion 23b and 25b is provided with an opening portion and a fin portion 27 covering at least a part of the opening portion A.

According to the above-described configuration, the heat exhaust efficiency of the secondary portion s 23b and 25b is improved by the opening portion A and the fin portion 27 formed in the secondary portion s 23b and 25b. Accordingly, the heat of the coil can be released more quickly.

(6) The coil 20 for the motor according to a sixth aspect may further include a rib 28 connecting the secondary portions 23b and 25b adjacent to each other.

According to the above-described configuration, since the secondary portions 23b and 25b are connected to each other by the rib 28, it is possible to reduce the possibility that the secondary portions 23b and 25b contact each other, for example, when a vibration is generated. Accordingly, it is possible to suppress noise.

(7) The coil 20 for the motor according to a seventh aspect may further include: a connection portion 29 covering end portions of the plurality of secondary portions 23b and 25b on the first side in the direction of the axis and being connected to a housing 3.

According to the above-described configuration, the heat of the secondary portion s 23b and 25b can be released to the housing 3 via the connection portion 29.

(8) The motor 100 according to an eighth aspect includes: the rotor 1 having a permanent magnet; a plurality of stator cores 26 which are annularly connected each other to surround an outer periphery of the rotor 1; and the coil 20 for the motor according to any one of the above-described aspects in which the stator core 26 is inserted through an inner peripheral side of the coil.

According to the above-described configuration, it is possible to provide the motor 100 that is more compact and has improved cooling efficiency.

(9) A method for manufacturing the coil 20 for the motor according to a ninth aspect is a method for manufacturing a coil 20 for a motor including a coil (the inner peripheral coil 22 and the outer peripheral coil 24) formed of a conductor wound around an axis (coil axis O2) and a plurality of cooling portions 23 and 25 provided to correspond to different winding layers in the conductor, each of the cooling portions 23 and 25 including a primary portion 23a and 25a protruding from the winding layer radially outward and a secondary portion 23b and 25b extending from a tip of the primary portion 23a and 25a toward a first side in a direction of the axis, the primary portions 23a and 25a being formed so that the protrusion length of one of the primary portions 23a and 25a, which is located closer to a second side in the direction of the axis than another of the primary portions 23a and 25a, is longer than that of another of the primary portions 23a and 25a, the secondary portions 23b and 25b being formed so that one of the secondary portion 23b and 25b, which is joined to one of the primary portion 23a and 25a located closer to the second side in the direction of the axis than another of the primary portions 23a and 25a, is positioned further outside in the radial direction with respect to another of the secondary portions 23b and 25b joined to the another of the secondary portion s 23b and 25b, and at least a two of the plurality of secondary portions 23b and 25b being arranged to overlap each other at intervals in a radial direction, the method including: a step (step S1) of integrally forming the coil and the cooling portion 23 and 25 by additive modeling.

According to the above-described configuration, since the coil and the cooling portions 23 and 25 are integrally formed with each other by additive modeling, it is possible to more easily manufacture the coil 20 for the motor in a short time.

INDUSTRIAL APPLICABILITY

According to the present disclosure, it is possible to provide a coil for a motor, a method for manufacturing a coil for a motor, and a motor that can be easily manufactured and decreased in size.

REFERENCE SIGNS LIST

100 Motor
1 Rotor
2 Stator
3 Housing
20 Coil for motor
22 Inner peripheral coil
23 Cooling portion
23a Primary portion
23b Secondary portion
24 Outer peripheral coil
25 Cooling portion
25a Primary portion
25b Secondary portion
26 Stator core
26a Yoke portion
26b Teeth
26c Tip portion
27 Fin portion
28 Rib
29 Connection portion
5 A Opening portion
h Ventilation hole
O1 Main axis
O2 Coil axis

What is claimed is:

1. A coil for a motor comprising:
a coil which is formed of a conductor wound around an axis; and
a plurality of cooling portions which are provided to correspond to different winding layers in the conductor, wherein
each of the cooling portions includes a primary portion protruding from the winding layer radially outward and a secondary portion extending from a tip of the primary portion toward a first side in a direction of the axis,
the primary portions are formed so that one primary portion of the primary portions is located closer to a second side in the direction of the axis than another primary portion of the primary portions, wherein a protrusion length of the one primary portion is longer than that of the another primary portion,
the secondary portions are formed so that one secondary portion of the secondary portions is joined to one of the primary portions located closer to the second side in the direction of the axis than the another primary portion, wherein said one secondary portion is positioned further outside in the radial direction with respect to the another secondary portion joined to the another primary portion, and
at least two secondary portions of the plurality of secondary portions are arranged to overlap each other at intervals in a radial direction.

2. The coil for the motor according to claim 1, wherein the secondary portion joined to the primary portion located on the first side in the direction of the axis protrudes more toward the first side in the direction of the axis.

3. The coil for the motor according to claim 1, further comprising:
an insulating layer which is formed on surfaces of the coil and the cooling portion.

4. The coil for the motor according to claim 1, wherein the coil is provided with at least one of a ventilation hole penetrating the primary portion in a radial direction and another ventilation hole penetrating the secondary portion in a circumferential direction.

5. The coil for the motor according to claim 1, wherein the secondary portion is provided with an opening portion and a fin portion covering at least a part of the opening portion.

6. The coil for the motor according to claim 1, further comprising:
a rib connecting the secondary portions adjacent to each other.

7. The coil for the motor according to claim 1, further comprising:
a connection portion covering end portions of the plurality of secondary portions on the first side in the direction of the axis and being connected to a housing.

8. A motor comprising: a rotor having a permanent magnet; a plurality of stator cores which are annularly connected each other to surround an outer periphery of the rotor; and the coil for the motor according to claim 1, wherein the stator core is inserted through an inner peripheral side of the coil.

9. A method for manufacturing a coil for a motor including a coil formed of a conductor wound around an axis and a plurality of cooling portions provided to correspond to different winding layers in the conductor, each of the cooling portions including a primary portion protruding from the winding layer radially outward and a secondary portion extending from a tip of the primary portion toward a first side in a direction of the axis, the primary portions being formed so that
one primary portion of the primary portions is located closer to a second side in the direction of the axis than another primary portion of the primary portions, wherein a protrusion length of the one primary portion is longer than that of the another primary portion,
the secondary portions are formed so that one secondary portion of the secondary portions is joined to one of the primary portions located closer to the second side in the direction of the axis than the another primary portion, wherein said one secondary portion is positioned further outside in the radial direction with respect to the another secondary portion joined to the another primary portion, the method comprising:
integrally forming the coil and the cooling portion by additive modeling.

* * * * *